United States Patent
Hockemeyer et al.

(10) Patent No.: US 10,639,855 B2
(45) Date of Patent: May 5, 2020

(54) APPLICATOR SYSTEMS FOR APPLYING PRESSURE TO A STRUCTURE

(71) Applicant: General Electric Company, Schenectady, NY (US)

(72) Inventors: Matthew Harper Hockemeyer, Saratoga Springs, NY (US); Younkoo Jeong, Clifton Park, NY (US); James Duvall Bollacker, Albany, NY (US); Shatil Sinha, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 15/426,784

(22) Filed: Feb. 7, 2017

(65) Prior Publication Data

US 2018/0222130 A1 Aug. 9, 2018

(51) Int. Cl.
*B29C 70/44* (2006.01)
*B29C 33/54* (2006.01)
*B29C 33/38* (2006.01)
*B29C 70/46* (2006.01)

(52) U.S. Cl.
CPC .......... *B29C 70/44* (2013.01); *B29C 33/3821* (2013.01); *B29C 33/54* (2013.01); *B29C 70/46* (2013.01); *B29C 70/443* (2013.01)

(58) Field of Classification Search
CPC ....... B29C 70/44; B29C 33/54; B29C 70/443; B29C 70/46; B29C 33/3821
See application file for complete search history.

(56) References Cited

U.S. PATENT DOCUMENTS

| 3,675,962 | A | | 7/1972 | Simpson |
| 4,561,686 | A | * | 12/1985 | Atchley ................ B66C 1/0206 |
| | | | | 294/188 |
| 4,682,716 | A | | 7/1987 | Morellini |
| 5,227,176 | A | | 7/1993 | McIntyre-Major |
| 5,427,518 | A | | 6/1995 | Morizot et al. |
| 7,128,869 | B2 | | 10/2006 | Habisreitiger et al. |
| 7,927,539 | B2 | | 4/2011 | Ederer |

(Continued)

FOREIGN PATENT DOCUMENTS

| CA | 951471 A | 7/1974 |
| EP | 2 803 471 A1 | 11/2014 |

(Continued)

OTHER PUBLICATIONS

Extended European Search Report and Opinion issued in connection with corresponding EP Application No. 18154127.7 dated Jun. 13, 2018.

(Continued)

*Primary Examiner* — Joseph S Del Sole
*Assistant Examiner* — Jerzi H Moreno Hernandez
(74) *Attorney, Agent, or Firm* — Armstrong Teasdale LLP (57) ABSTRACT

An applicator assembly for applying pressure to a composite structure includes an external frame, an applicator casing disposed substantially within the external frame, and an applicator disposed substantially within the applicator casing. The applicator casing includes a first membrane, and a first jamming material disposed within the first membrane. The applicator includes a second membrane, and a second jamming material disposed within said second membrane.

14 Claims, 12 Drawing Sheets

(56) References Cited

U.S. PATENT DOCUMENTS

| | | |
|---|---|---|
| 8,548,626 B2 | 10/2013 | Steltz et al. |
| 8,613,301 B2 | 12/2013 | Brennan et al. |
| 8,882,165 B2 | 11/2014 | Lipson et al. |
| 8,944,481 B2 | 2/2015 | Collado Jimenez et al. |
| 9,120,230 B2 | 9/2015 | Lipson et al. |
| 9,211,660 B2 | 12/2015 | Borland |
| 9,481,111 B1* | 11/2016 | Van Ert ............... B29C 33/3885 |
| 2004/0222562 A1* | 11/2004 | Kirchner ................ B29C 43/10 264/314 |
| 2007/0290389 A1* | 12/2007 | Younie ............... B29C 33/3821 264/69 |
| 2009/0224426 A1* | 9/2009 | Micarelli ............... B29C 43/10 264/319 |
| 2009/0309264 A1* | 12/2009 | Cavaliere ........... B29C 33/3821 264/319 |
| 2009/0309268 A1* | 12/2009 | Cavaliere ........... B29C 33/3821 264/511 |
| 2010/0143525 A1* | 6/2010 | Kuntz .................. B29C 33/308 425/342.1 |
| 2012/0280421 A1 | 11/2012 | Keating et al. |
| 2014/0292010 A1 | 10/2014 | Graupner et al. |
| 2015/0107233 A1* | 4/2015 | Ou ......................... F15B 15/10 60/327 |
| 2015/0183139 A1* | 7/2015 | Takano .................. B29C 70/44 264/219 |
| 2015/0217457 A1* | 8/2015 | Lipson ................ B25J 15/0023 294/86.4 |
| 2016/0031166 A1 | 2/2016 | Desjardien et al. |

FOREIGN PATENT DOCUMENTS

| | | |
|---|---|---|
| FR | 2 066 806 A5 | 8/1971 |
| WO | 2009124724 A1 | 10/2009 |
| WO | 2015006613 A1 | 1/2015 |
| WO | 2016075424 A1 | 5/2016 |

OTHER PUBLICATIONS

Brown et al., Universal robotic gripper based on the jamming of granular material, Proceedings of the National Academy of Sciences of the United States of America, vol. 107, Issue: 44, Nov. 2, 2010.

Scott, Peter B., "The 'Omnigripper': A form of robot universal gripper," Robotica 3, No. 03 (1985): 153-158.

Amend, John R. et al., "A positive pressure universal gripper based on the jamming of granular material," IEEE Transactions on Robotics 28, No. 2 (2012): 341-350.

Reddy, Patakota Venkata Prasad et al., "A review on importance of universal gripper in industrial robot applications," Int. J. Mech. Eng. Robot. Res 2, No. 2 (2013): 255-264.

* cited by examiner

APPLICATOR SYSTEMS FOR APPLYING PRESSURE TO A STRUCTURE

BACKGROUND

The subject matter disclosed herein relates to applicator systems for applying pressure to a structure and, more particularly, to applicator systems that include applicators that are jammed under vacuum and unjammed under positive pressure to form a structure on a forming tool.

At least some systems for pressure forming structures (e.g., compaction systems or applicator systems) are used in the manufacture and construction of laminated composite structures, such as in the aerospace industry for the construction of composite airframes and airframe structural members. Such structures are typically constructed from a plurality of layers of material, or "plies," which are placed over a form and compacted under pressure.

Many known compaction systems include a tool, such as a mandrel or form, over which a structure is placed for compaction. A vacuum bag may be placed over the structure and sealed upon the form under pressure to compress the structure. Other known applicator systems include a shaped metallic compaction tool configured to press the structure into a desired shape on the tool. Such systems typically fail to account for variability in material thickness of the structure and/or apply insufficient pressure during compression of the structure.

BRIEF DESCRIPTION

In one aspect, an applicator assembly for applying pressure to a composite structure is provided. The applicator assembly includes an external frame, an applicator casing disposed substantially within the external frame, and an applicator disposed substantially within the applicator casing. The applicator casing includes a first membrane, and a first jamming material disposed within the first membrane. The applicator includes a second membrane, and a second jamming material disposed within the second membrane.

In another aspect, an applicator system for applying pressure to a composite structure is provided. The applicator system includes a forming tool having a receiving surface for receiving a composite structure, an air pump, and an applicator assembly coupled to the air pump and configured to press the composite structure on the receiving surface. The applicator assembly includes an external frame, an applicator casing disposed substantially within the external frame, and an applicator disposed substantially within the applicator casing. The applicator casing includes a first membrane, and a first jamming material disposed within the first membrane. The applicator includes a second membrane, and a second jamming material disposed within the second membrane.

In yet another aspect, an applicator assembly for applying pressure to a composite structure is provided. The applicator assembly includes an external frame and an applicator disposed substantially within the external frame. The applicator includes a membrane and a jamming material disposed within the membrane. The applicator is configured to be jammed under vacuum and unjammed under positive pressure to compress a composite structure on a receiving surface of a tool disposed in opposition to the applicator.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to applicator systems for applying pressure to a structure. More particularly, embodiments of the present disclosure relate to applicator systems that include an applicator that is jammed under vacuum and/or unjammed under positive pressure, such that the applicator is, in an unjammed configuration, deformable about a receiving surface of a forming tool and, in a jammed configuration, holds the shape of the forming tool for forming a structure on the forming tool. The structure is placed on the forming tool and a loading force is applied through the applicator assembly to the structure to press the structure on the forming tool. In addition, in some embodiments, the applicator is pressurized to apply additional pressure on the structure over the forming tool.

With respect to the embodiments described below, and in any of the embodiments, heat may be applied to the structure. For example, heat may be applied to the structure by an applicator, an applicator frame, or both. In addition, heat may be circulated through the jamming material disposed within an applicator or applicator frame, such as by one or more electrical heating element disposed within the applicator or applicator casing. In addition, in some embodiments, one or more membranes (e.g., a membrane of an applicator and/or a membrane of an applicator casing) may include one or more electrical heating elements, which may be configured to heat the membrane. Heat circulated through the jamming material and/or through the one or more membranes may be sufficient to make a structure being formed, such as a laminate composite structure, plaint or deformable.

As used herein, a structure, such as an applicator or applicator casing, is "jammed" when air is withdrawn from the applicator or applicator casing, such as under vacuum or partial vacuum, to force particles of a jamming material within the applicator or applicator casing into a rigid or semi-rigid configuration.

As used herein, a structure, such as an applicator or applicator casing, is "pressurized" when air is pumped into the applicator or applicator casing. During pressurization, the applicator or applicator casing becomes rigid or semi-rigid.

As used herein, a structure, such as an applicator or applicator casing, is "unjammed" or "relaxed" when a small amount of air or no air is pumped into applicator or applicator casing, or when air is released from an applicator or applicator casing, such that particles of a jamming material within the applicator or applicator casing are flowable or semi-flowable, and such that the applicator or applicator casing is flexible or deformable.

Although various applicator systems are described below with reference to the figures, it will be understood that these systems are merely exemplary and that other applicator systems capable of jamming and pressurization operations are also contemplated. For example, the specific jamming and unjamming operations described in connection with each applicator system below may vary based upon one or more factors, such as the jamming material used in each applicator system and the structure to be formed.

Figure 1:
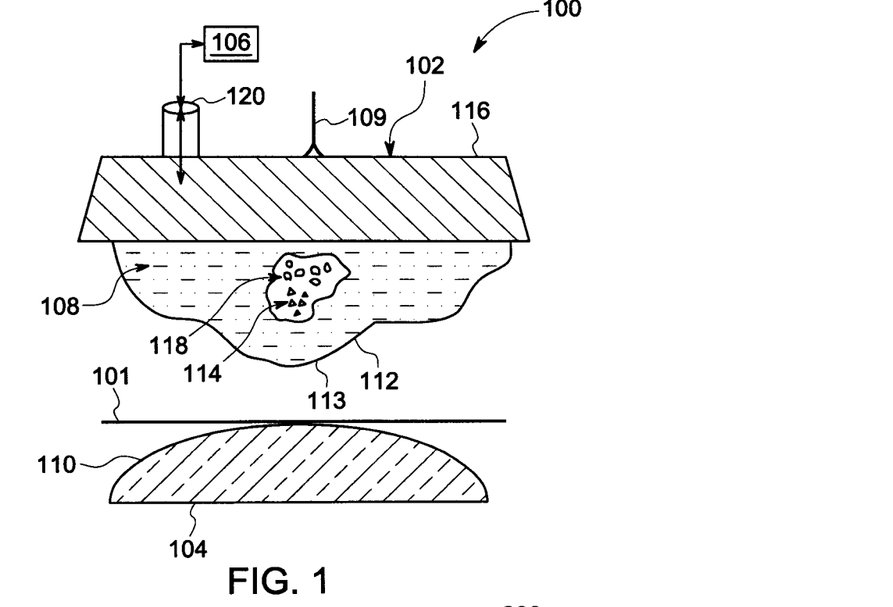
FIG. 1 is a cross-sectional view of an exemplary applicator system for applying pressure to a composite structure.

FIG. 1 is a cross-sectional view of an exemplary applicator system 100 for applying pressure to a structure 101, such as, and without limitation, a composite laminate structure. Applicator system 100 includes an applicator assembly 102, a forming tool 104, an air pump 106, and a movement mechanism 109. Movement mechanism 109 may translate about an axis or system of axes which are used to control the movement of the applicator assembly 102. In various embodiments, movement mechanism 109 is an actuator, such as a linear actuator or a robotic arm. In some embodiments, applicator system 100 includes an air filter (not shown) disposed in fluid communication with air pump 106 and configured to filter air entering and/or exiting air pump 106.

In the exemplary embodiment, forming tool 104 is a rigid structure configured to receive structure 101 for forming on forming tool 104. Forming tool 104 thus includes a receiving surface 110 that is shaped to receive structure 101 and on which structure 101 is pressed into a desired shape or form.

Applicator assembly 102 includes an applicator 108 and an external frame 116. Applicator 108 includes a membrane 112 and a jamming material 114. Membrane 112 is flexible and is made from any suitable flexible material, such as an elastomer, a rubber compound, or any other suitable material that is substantially gas impermeable and flexible. Membrane 112 also includes an outer surface 113 that is configured to make contact with receiving surface 110 of forming tool 104.

Membrane 112 is filled with jamming material 114. More particularly, a cavity 118 is defined within membrane 112, and cavity 118 is filled with jamming material 114.

In the exemplary embodiment, jamming material 114 is a granular media in which forces (such as normal forces, friction forces, Van der Wall forces) acting between particles of jamming material 114 can be varied to create a network of granular particles having a variable or adjustable rigidity. In various embodiments, jamming material 114 includes particles such as sand, glass beads, different organic particles (e.g., coffee grounds, tree nut shells), or any other granular media within which forces acting between the particles can be varied to influence the rigidity of the network or system of particles as a whole.

External frame 116 is a rigid support member to which membrane 112 is coupled and/or sealed. External frame 116 also includes a vacuum port 120 that is coupled to air pump 106. Movement mechanism 109 is mechanically coupled to external frame 116 and configured to apply a loading force to external frame 116.

Figure 2:
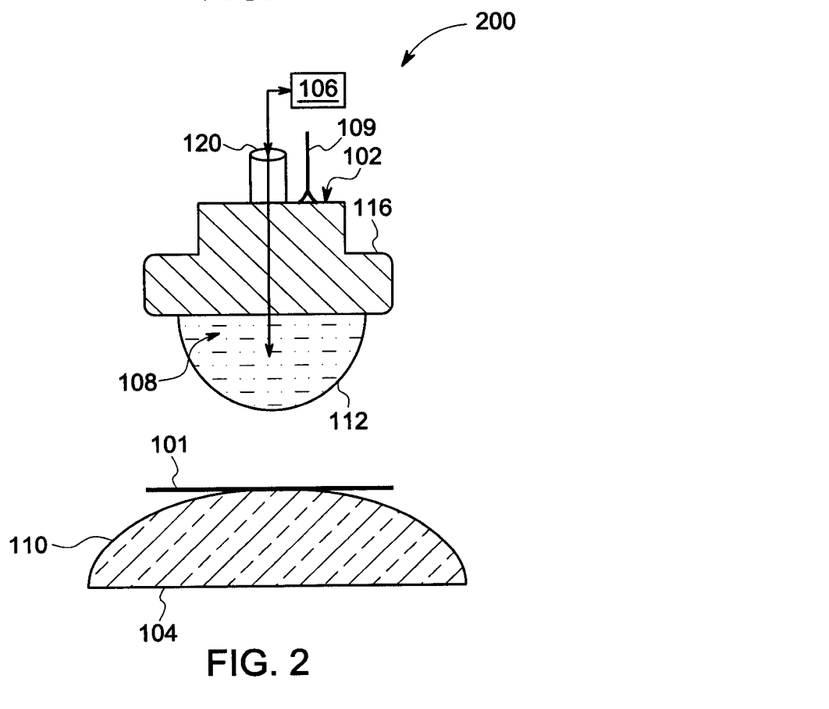
FIGS. 2-5 are a series of cross-sectional views of the applicator system shown in FIG. 1, illustrating operation of the applicator system.
Figure 3:
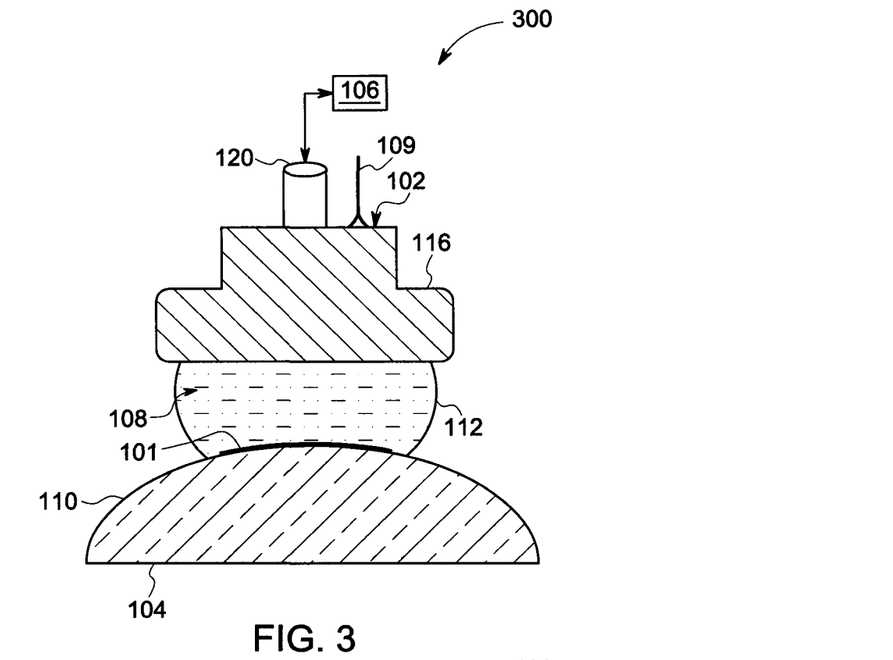
Figure 4:
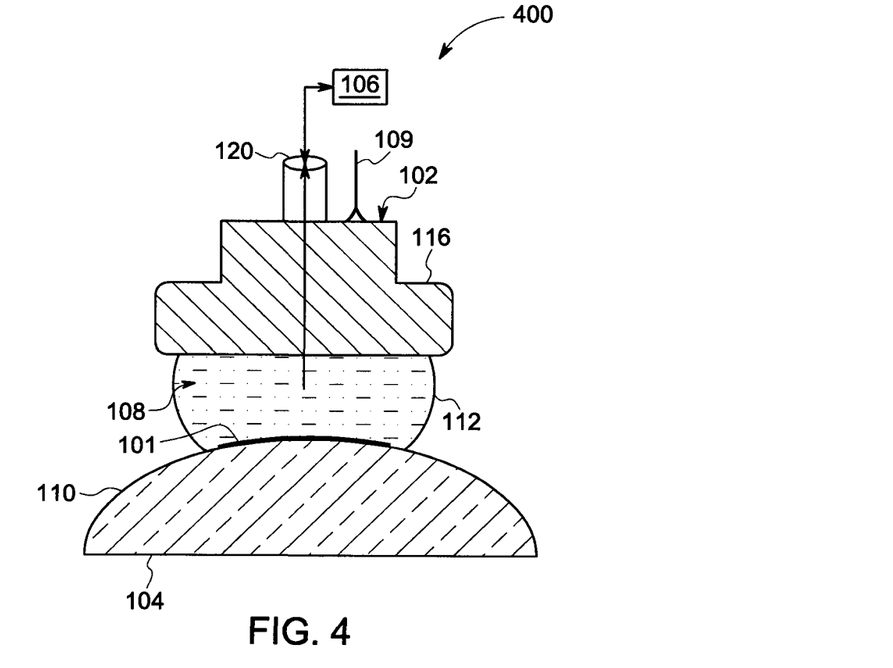

FIGS. 2-4 are a series of cross-sectional views of applicator system 100, illustrating operation of applicator system 100. Accordingly, with attention to FIG. 2, during operation, a small amount of air is pumped into cavity 118 of applicator 108 to reduce the forces acting between particles of jamming material 114, such that jamming material 114 is able to shift and flow within cavity 118. Membrane 112 is thus compliant about jamming material 114, and the shape of applicator 108 is adjustable or deformable. In some embodiments, no air is pumped into cavity 118 and/or air is released, which leaves jamming material 114 in a relaxed state, such that jamming material 114 is able to shift and flow within cavity 118.

As shown with reference to FIG. 3, applicator assembly 102 is lowered over or otherwise moved into contact with receiving surface 110 of forming tool 104. In some embodiments, movement mechanism 109 moves applicator assembly 102 into and out of contact with forming tool 104. As applicator assembly 102 makes contact with forming tool 104, jamming material 114 flows or shifts within membrane 112, such that applicator 108 takes the shape of receiving surface 110 of forming tool 104.

With reference to FIG. 4, air is pumped out of cavity 118 of applicator 108, causing jamming material 114 to become rigid, or jam, within applicator 108. Applicator 108 is thus jammed in the shape of receiving surface 110 of forming tool 104. This may happen progressively and at any stage during the movement of applicator assembly 102 towards the surface of forming tool 104

Figure 5:
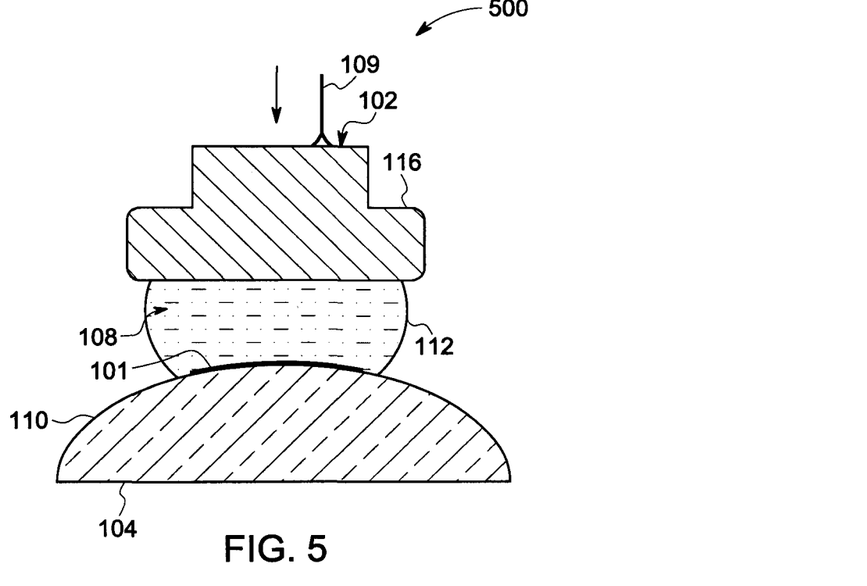

As shown with reference to FIG. 5, an external force is also applied, such as by movement mechanism 109, such that structure 101 is pressed and compacted between applicator 108 and forming tool 104. The external force applied is sufficient to smoothly and suitably compact structure 101 as well as to give structure 101 the desired shape against forming tool 104. In addition, in some embodiments, applicator 108 is pressurized under positive pressure, such that applicator 108 applies an additional loading force or pressure against structure 101 on forming tool 104.

Figure 6:
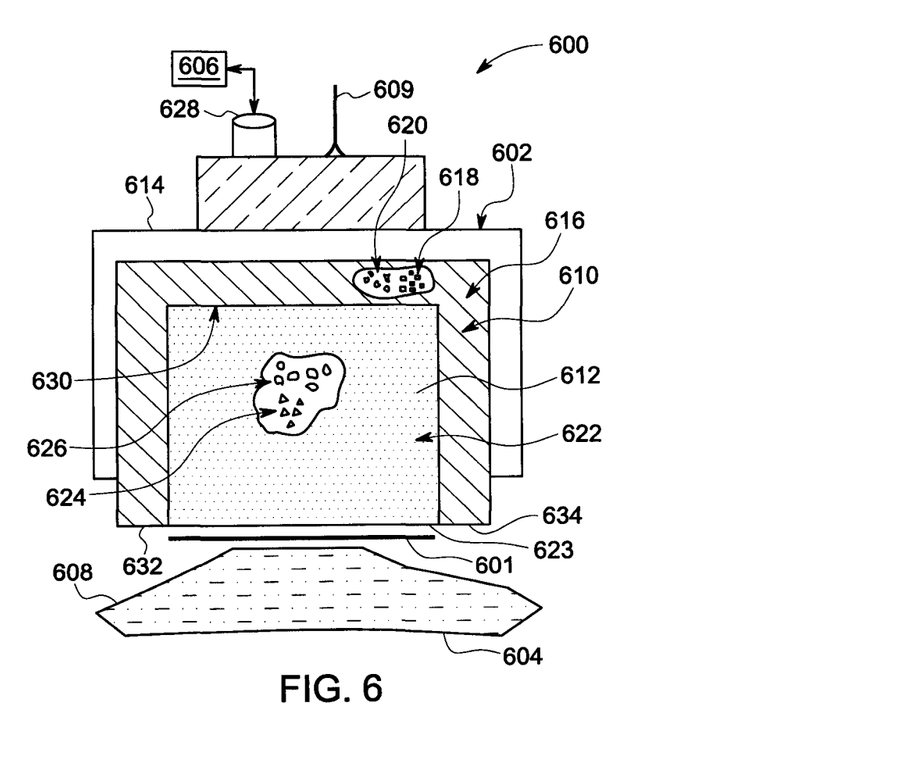
FIG. 6 is a cross-sectional view of an alternative applicator system for applying pressure to a composite structure.

FIG. 6 is a cross-sectional view of an alternative applicator system 600 for applying pressure to a structure 601. Applicator system 600 includes an applicator assembly 602, a forming tool 604, an air pump 606, and a movement mechanism 609. Movement mechanism 609 may translate about an axis or system of axes which are used to control the movement of the applicator assembly 602. In various embodiments, movement mechanism 609 is an actuator, such as a linear actuator or a robotic arm. In some embodiments, applicator system 600 includes an air filter (not shown) disposed in fluid communication with air pump 606 and configured to filter air entering and/or exiting air pump 606.

In the exemplary embodiment, forming tool 604 is substantially similar to forming tool 104. For example, forming tool 604 is a rigid structure configured to receive structure 601, such as a composite laminate structure, for forming on forming tool 604. Forming tool 604 thus includes a receiving surface 608 that is shaped to receive structure 601 and on which structure 601 is pressed into a desired shape or form.

Applicator assembly 602 includes an applicator casing 610, an applicator 612, and an external frame 614. Applicator casing 610 includes a first membrane 616 and a first jamming material 618. First membrane 616 is flexible and is made from any suitable flexible material, such as an elastomer, a rubber compound, or any other suitable material that is substantially gas impermeable and flexible.

First membrane 616 is filled with first jamming material 618. More particularly, a cavity 620 is defined within first membrane 616, and first jamming material 618 fills cavity 620. First jamming material 618 is the same as jamming material 114.

Applicator 612 includes a second membrane 622 and a second jamming material 624. Second membrane 622 is flexible and is made from any suitable flexible material, such as an elastomer, a rubber compound, or any other suitable material that is substantially gas impermeable and flexible. Second membrane 622 includes a contact surface 623 that is configured to make contact with structure 601.

Second membrane 622 is filled with second jamming material 624. For example, a cavity 626 is defined within second membrane 622, and second jamming material 624 fills cavity 626. In the exemplary embodiment, second jamming material 624 is the same as first jamming material 618. However, in various embodiments, second jamming material is different from first jamming material 618. In other words, in some embodiments, first membrane 616 is filled with one type of jamming material (e.g., sand), while second membrane 622 is filled with another type of jamming material (e.g., tree nut shells).

External frame 614 is a rigid support member to which applicator casing 610 is coupled and/or sealed. External frame 614 includes a vacuum port 628 that is coupled to air pump 606. Movement mechanism 609 is also mechanically coupled to external frame 614 and configured to apply a loading force to external frame 614.

In the exemplary embodiment, applicator casing 610 is substantially n-shaped and first membrane 616 of applicator casing 610 defines a pocket 630 that is configured to receive or house applicator 612. Thus, applicator 612 is disposed at least partially within pocket 630 of applicator casing 610. Applicator 612 is coupled within applicator casing 610, such as by one or more fasteners, an adhesive, heat bonding, and the like.

Vacuum port 628 is in fluid communication with applicator casing 610, such that air pump 606 is able to withdraw air from applicator casing 610 to jam applicator casing 610 and to pump air into applicator casing 610 to pressurize applicator casing 610. Similarly, vacuum port 628 is in fluid communication with applicator 612, such that air pump 606 is able to withdraw air from applicator 612 to jam applicator 612 and to pump air into applicator 612 to pressurize applicator 612. In some embodiments, a selectively configurable valve (not shown) is included in vacuum port 628 to selectively control jamming and unjamming operations for each of applicator casing 610 and applicator 612. In other embodiments, applicator casing 610 and applicator 612 are coupled to independent vacuum ports (not shown), such that one or more air pumps can be operated to independently jam and unjam applicator casing 610 and applicator 612.

In addition, applicator casing 610 includes a first contact surface 632 and a second contact surface 634, each of which is configured to make contact with receiving surface 608 of forming tool 604. First contact surface 632 and second contact surface 634 are flexible and configured to conform to receiving surface 608 of forming tool 604. In the exemplary embodiment, first contact surface 632 and second contact surface 634 are configured to form a seal with receiving surface 608 of forming tool 604, such that, when applicator 612 is pressurized within applicator casing 610, second membrane 622 of applicator 612 does not burst under pressure.

Figure 7:
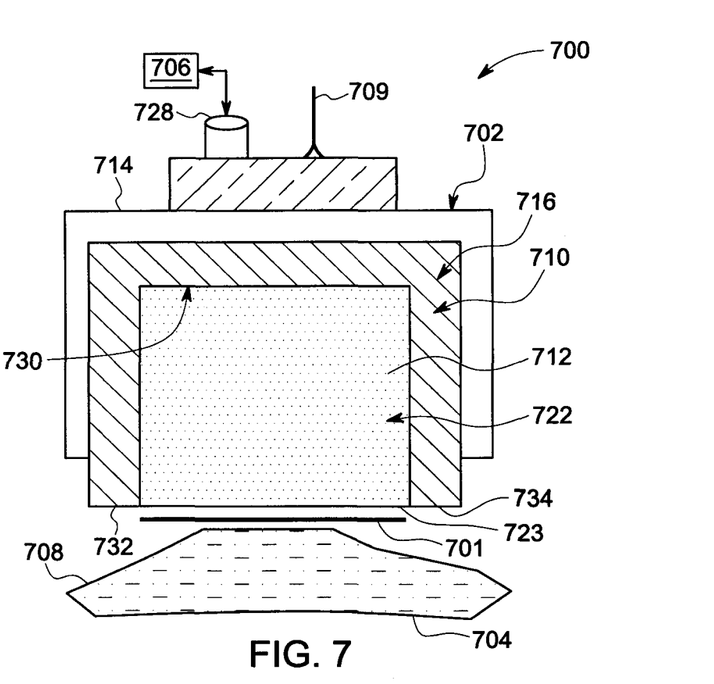
FIGS. 7-9 are a series of cross-sectional views of the applicator system shown in FIG. 6, illustrating a first exemplary operation of the applicator system.
Figure 8:
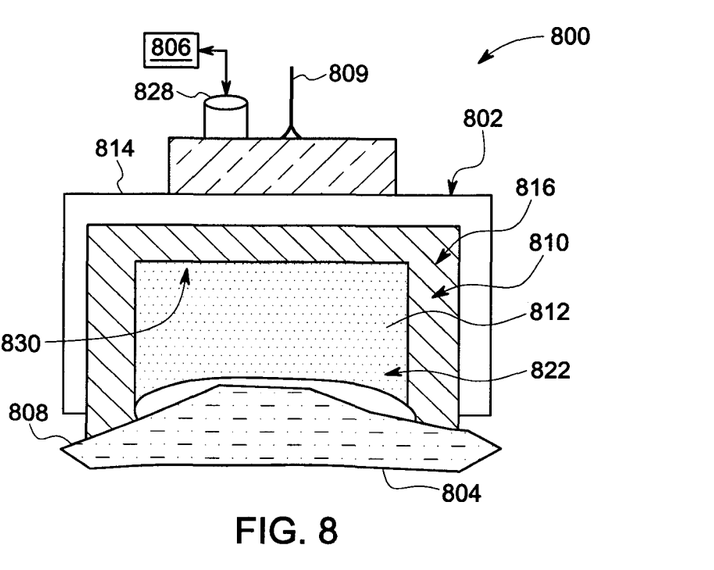
Figure 9:
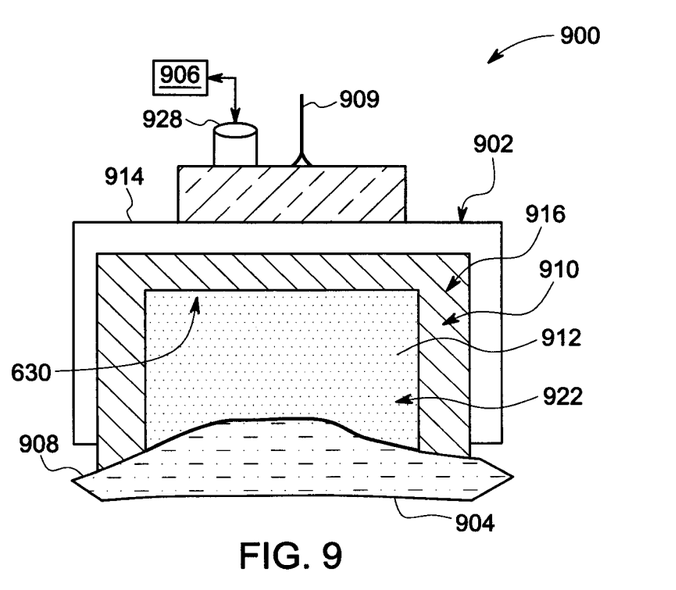

FIGS. 7-9 are a series of cross-sectional views of applicator system 600, illustrating a first exemplary operation of applicator system 600. Accordingly, with attention to FIG. 7, during operation, applicator assembly 602 is lowered or otherwise placed in contact with structure 601 on forming tool 604, such as by movement mechanism 609. In this example, both of applicator casing 610 and applicator 612 begin operation in an unjammed or relaxed configuration.

With reference to FIG. 8, once applicator 612 is in contact with structure 601 of forming tool 604, applicator 612 may be jammed, and/or applicator casing 610 may be jammed. In addition, as shown, first contact surface 632 and second contact surface 634 of applicator casing 610 make contact against receiving surface 608 of forming tool 604, which is irregularly shaped, such that receiving surface 608 is non-planar or includes at least one non-planar feature. In some embodiments, first contact surface 632 and second contact surface 634 form at least a partial seal against receiving surface 608.

As shown with reference to FIG. 9, once applicator casing 610 is in contact with and/or sealed on receiving surface 608 of forming tool 604, air is pumped into applicator 612 to pressurize applicator 612. As applicator 612 is pressurized, second membrane 622 of applicator 612 exerts pressure against first membrane 616 of applicator casing 610. In this configuration, applicator 612 is contained within applicator casing 610, which is jammed, such that applicator 612 is supported within jammed applicator casing 610 and does not burst under pressure. In addition, the pressure exerted by second membrane 622 of applicator 612 acts to press structure 601 onto receiving surface 608 of forming tool 604 and compresses or compacts structure 601 on receiving surface 608. In some embodiments, movement mechanism 609 also applies a loading force to external frame 614 to press structure 601 between applicator assembly 602 and receiving surface 608 of forming tool 604.

Figure 10:
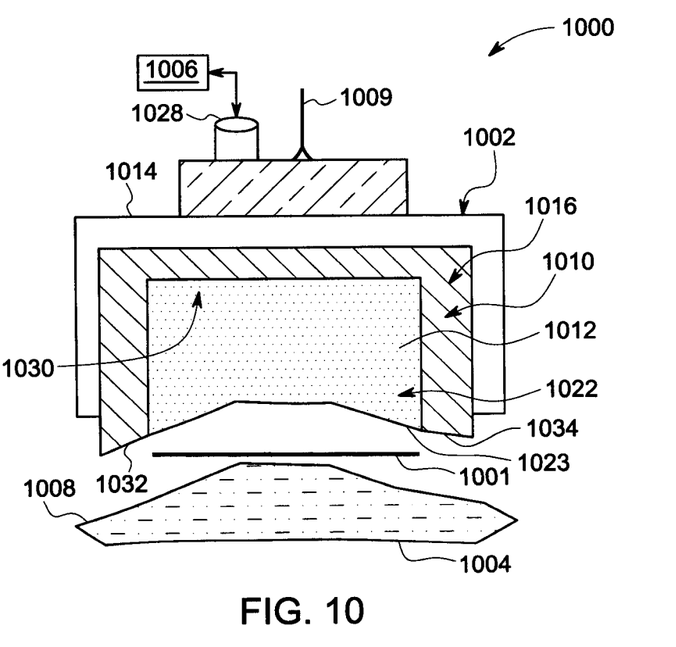
FIGS. 10-12 are a series of cross-sectional views of the applicator system shown in FIG. 6, illustrating a second exemplary operation of the applicator system.
Figure 11:
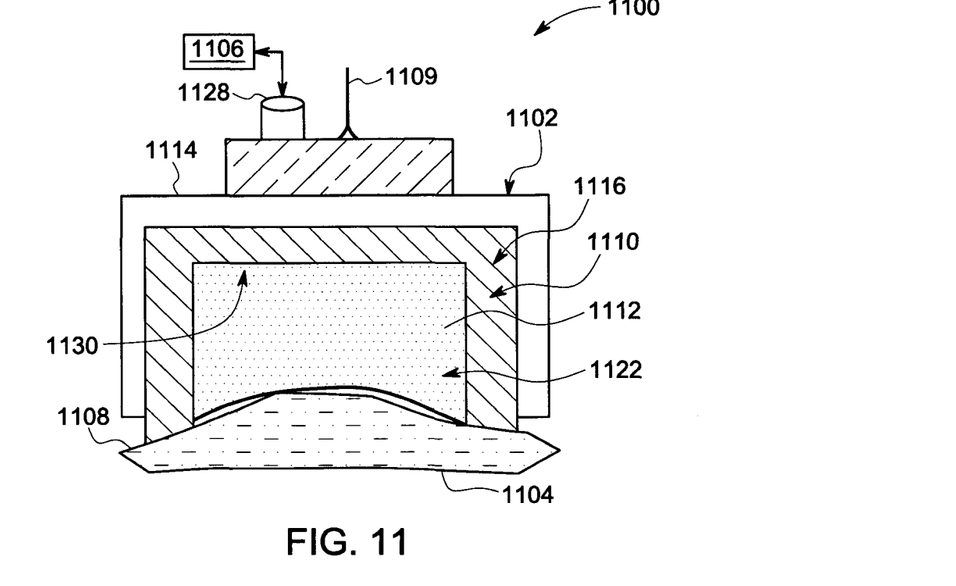
Figure 12:
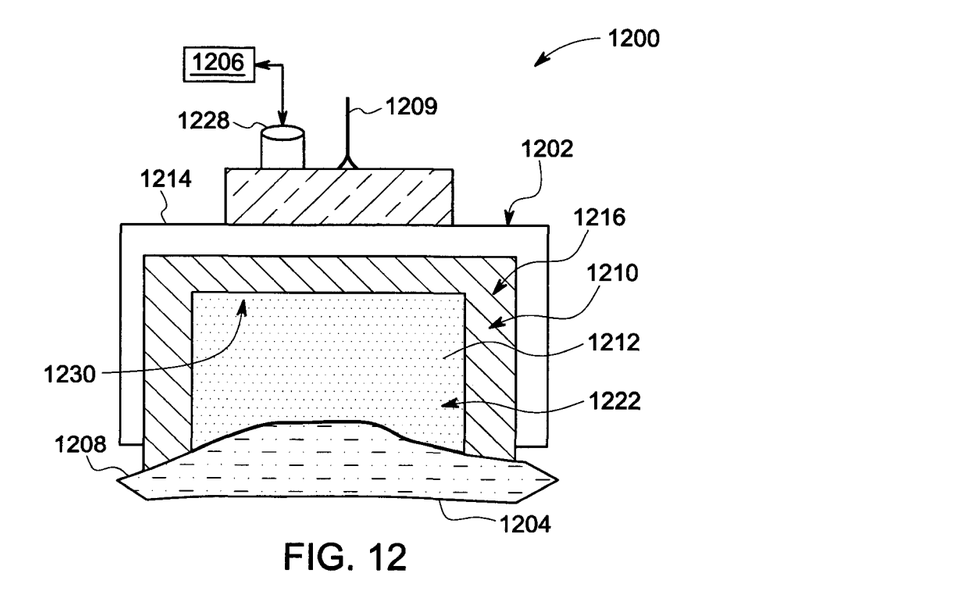
Figure 13:
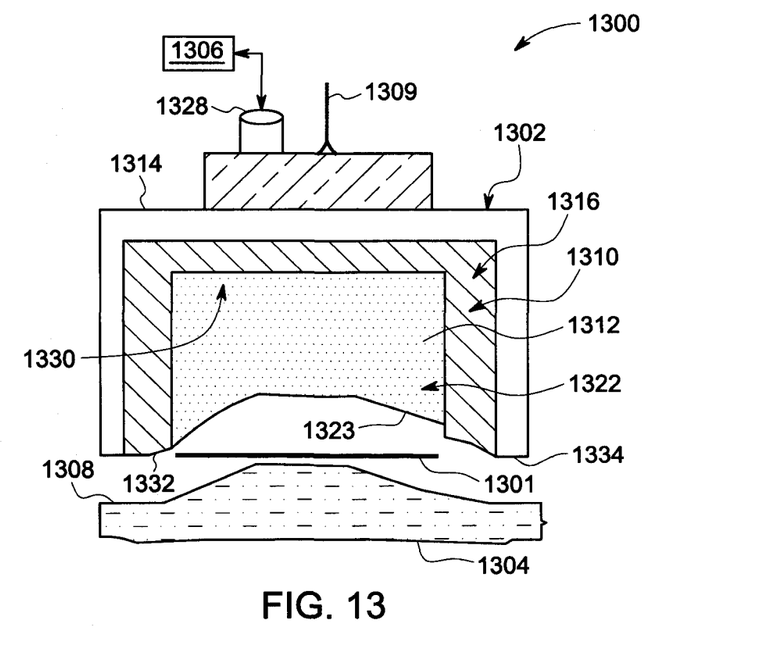
FIGS. 13-16 are a series of cross-sectional views of the applicator system shown in FIG. 6, illustrating a third exemplary operation of the applicator system.
Figure 14:
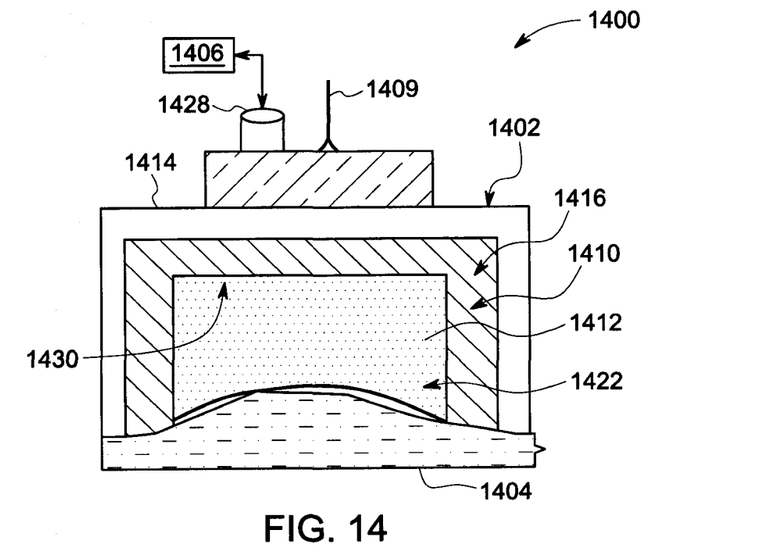

FIGS. 10-12 are a series of cross-sectional views of applicator system 600 (shown in FIG. 6), illustrating a second exemplary operation of applicator system 600. The second exemplary operation is substantially similar to the first exemplary operation described above with reference to FIGS. 7-9, except that applicator casing 610 and applicator 612 begin in jammed configurations. Thus, in the second exemplary operation, applicator 612 is brought into contact with structure 601 on receiving surface 608 of forming tool 604 already jammed and partially surrounded by jammed applicator casing 610.

Figure 15:
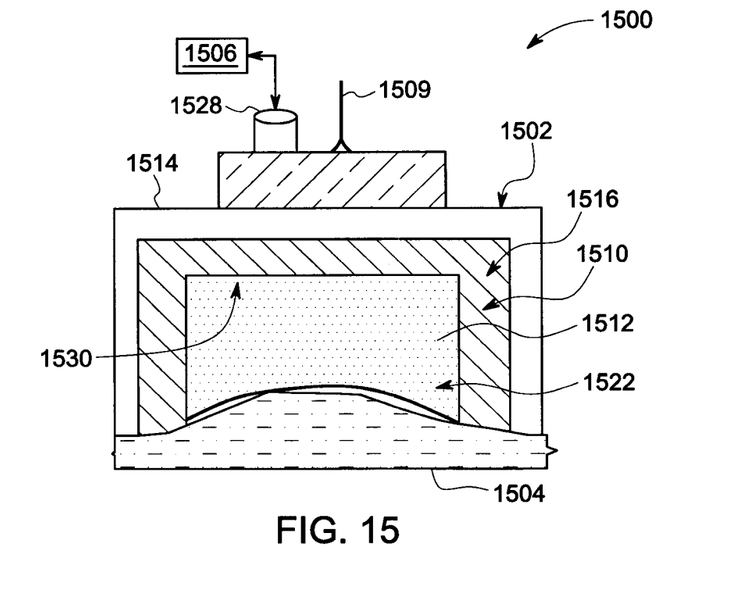
Figure 16:
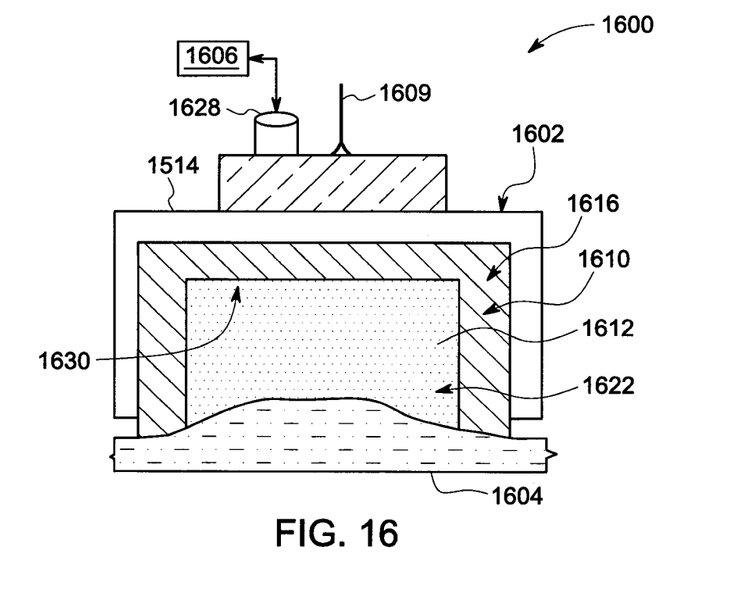

FIGS. 13-16 are a series of cross-sectional views of applicator system 600 (shown in FIG. 6), illustrating a third exemplary operation of applicator system 600. The third exemplary operation is substantially similar to the second exemplary operation described above with reference to FIGS. 10-12, in that applicator casing 610 and applicator 612 begin operation in a jammed configuration. However, as shown at FIG. 15, applicator casing 610 is pressurized over jammed applicator 612 to bring first contact surface 632 and second contact surface 634 of applicator casing 610 into pressurized contact with receiving surface 608 of forming tool 604. In addition, as shown with respect to FIG. 16, applicator 612 is pressurized within pressurized applicator casing 610 to exert additional pressure and compression force against structure 601 on receiving surface 608 of forming tool 604.

Figure 17:
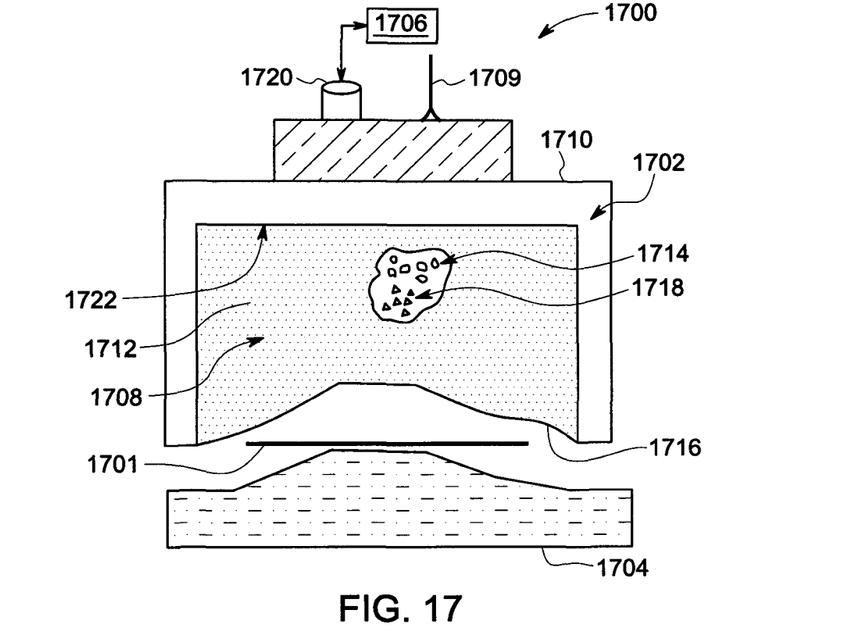
FIG. 17 is a cross-sectional view of another alternative applicator system for applying pressure to a composite structure.

FIG. 17 is a cross-sectional view of an alternative applicator system 1700 for applying pressure to a structure 1701. Applicator system 1700 is substantially similar to applicator system 600, except that applicator system 1700 does not include applicator casing 610. Accordingly, as shown, applicator system 1700 includes an applicator assembly 1702, a forming tool 1704, an air pump 1706, and a movement mechanism 1709. Forming tool 1704, air pump 1706, and movement mechanism 1709 are substantially similar to forming tool 604, air pump 606, and movement mechanism 609, respectively. Movement mechanism 1709 may translate about an axis or system of axes which are used to control the movement of applicator assembly 1702. In various embodiments, movement mechanism 609 is an actuator, such as a linear actuator or a robotic arm. In some embodiments, applicator system 1700 includes an air filter (not shown) disposed in fluid communication with air pump 1706 and configured to filter air entering and/or exiting air pump 1706.

In the exemplary embodiment, applicator assembly 1702 includes an applicator 1708 and an external frame 1710. Applicator 1708 includes a membrane 1712 and a jamming material 1714. Membrane 1712 is flexible and is made from any suitable flexible material, such as an elastomer, a rubber compound, or any other suitable material that is substantially gas impermeable and flexible. Membrane 1712 includes a contact surface 1716 that is configured to make contact with structure 1701.

Membrane 1712 is filled within jamming material 1714. For example, a cavity 1718 is defined within membrane 1712, and jamming material 1714 fills cavity 1718. In the exemplary embodiment, jamming material 1714 is the same as jamming material 114.

External frame 1710 is a rigid support member to which applicator 1708 is coupled and/or sealed. External frame 1710 includes a vacuum port 1720 that is coupled to air pump 1706. Vacuum port 1720 is in fluid communication with applicator 1708, such that air pump 1706 is able to withdraw air from applicator 1708 to jam applicator 1708 and to pump air into applicator 1708 to pressurize applicator 1708. Movement mechanism 1709 is mechanically coupled to external frame 1710 and configured to apply a loading force to external frame 1710.

External frame 1710 is substantially n-shaped and defines a recess 1722 that is configured to receive and/or house applicator 1708. Thus, applicator 1708 is disposed at least partially within recess 1722 of external frame 1710. In the exemplary embodiment, applicator 1708 is coupled within recess 1722, such as by one or more fasteners, an adhesive, heat bonding, and the like.

Figure 18:
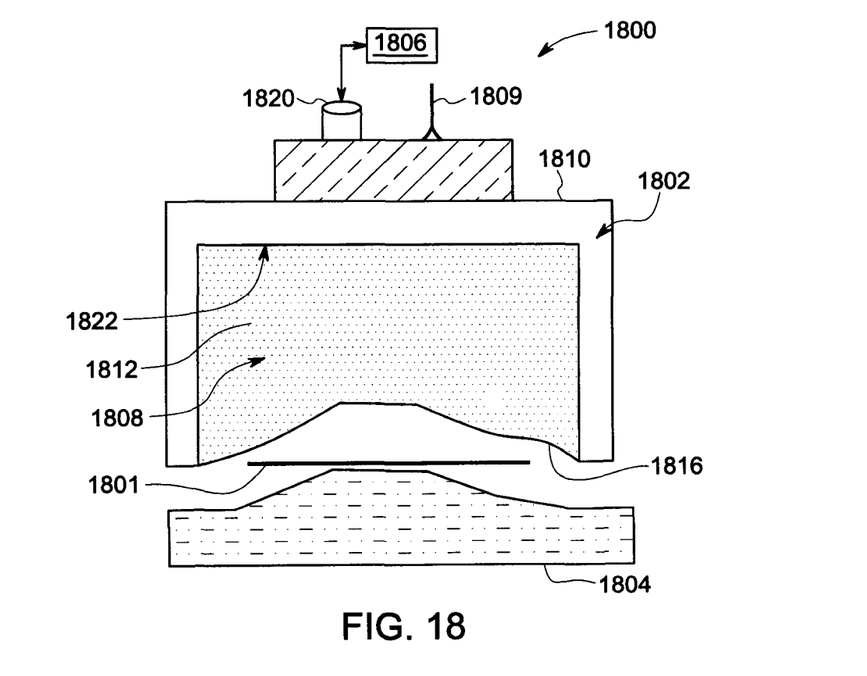
FIGS. 18-20 are a series of cross-sectional views of the applicator system shown in FIG. 17, illustrating a first exemplary operation of the applicator system.
Figure 19:
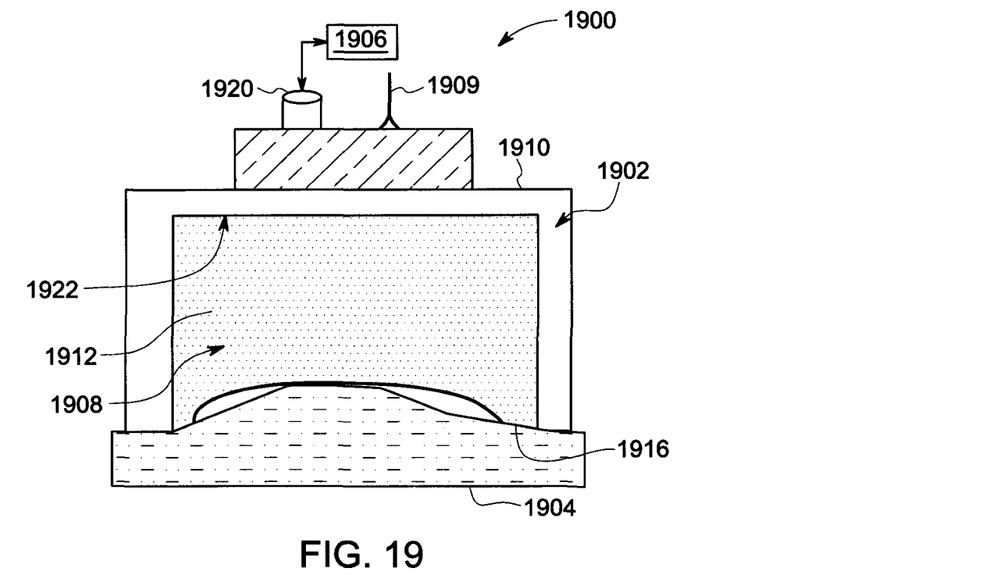
Figure 20:
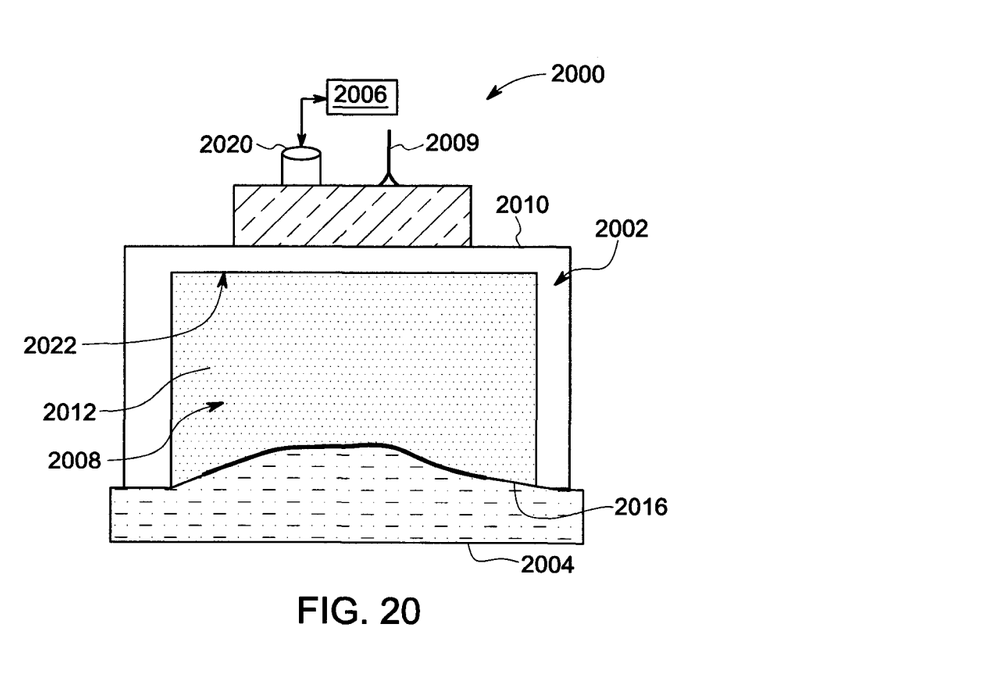

FIGS. 18-20 are a series of cross-sectional views of applicator system 1700, illustrating a first exemplary operation of applicator system 1700. Accordingly, with attention to FIGS. 18 and 19, during operation, applicator assembly 1702 is lowered or otherwise placed in contact with structure 1701 on forming tool 1704, such as by movement mechanism 1709. In this example, applicator 1708 is positioned over structure 1701 in an unjammed or relaxed configuration. With reference to FIG. 20, applicator 1708 is subsequently pressurized to exert a compressive force over structure 1701, such that structure 1701 is pressed, as described herein, onto forming tool 1704.

Figure 21:
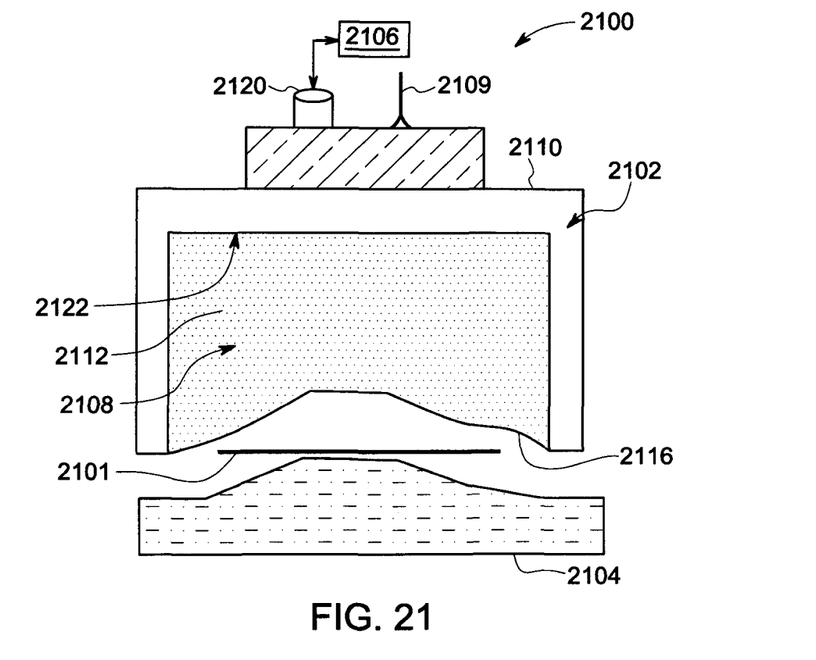
FIGS. 21-23 are a series of cross-sectional views of the applicator system shown in FIG. 17, illustrating a second exemplary operation of the applicator system.
Figure 22:
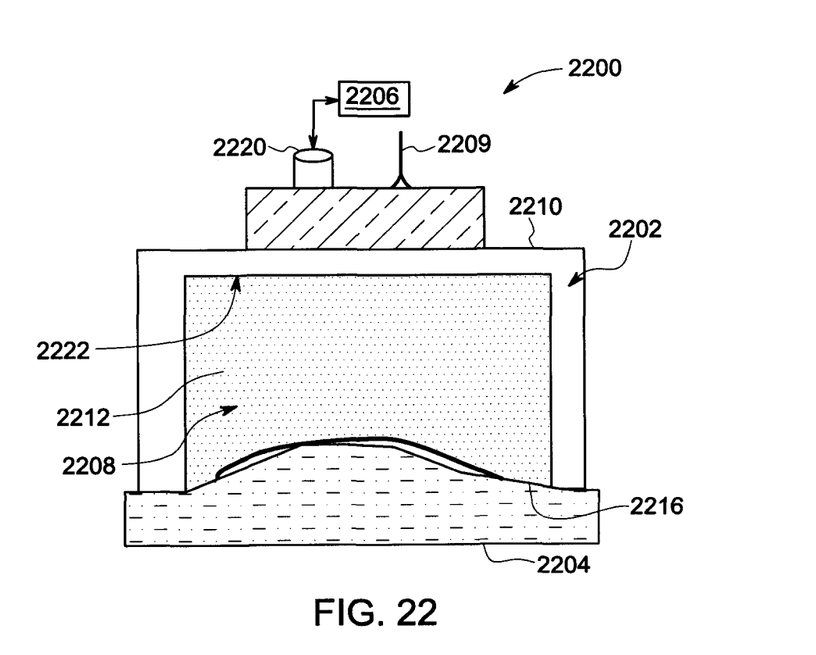
Figure 23:
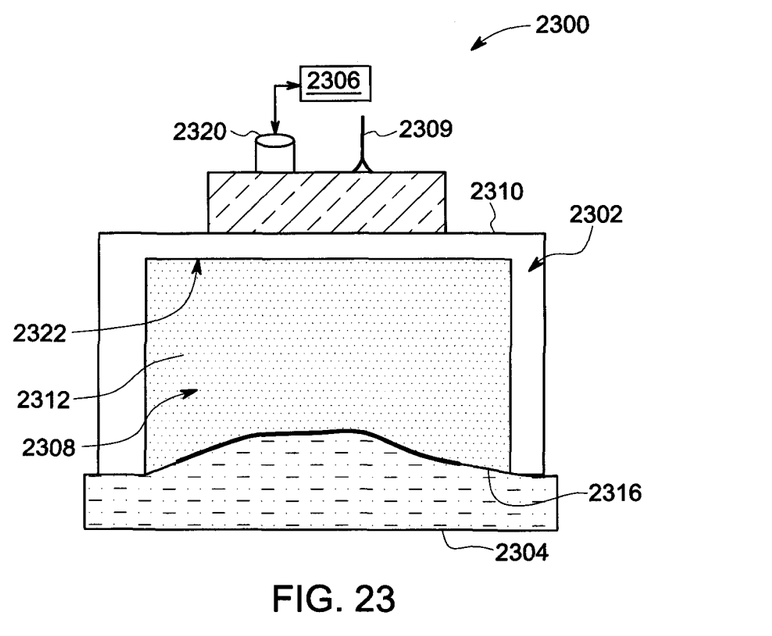

FIGS. 21-23 are a series of cross-sectional views of applicator system 1700, illustrating a second exemplary operation of applicator system 1700. Accordingly, with attention to FIGS. 21 and 22, during operation, applicator assembly 1702 is lowered or otherwise placed in contact with structure 1701 on forming tool 1704, such as by movement mechanism 1709. In this example, applicator 1708 is positioned over structure 1701 in jammed configuration. In addition, and with reference to FIG. 23, applicator 1708 is subsequently pressurized to exert a compressive force over structure 1701, such that structure 1701 is pressed, as described herein, onto forming tool 1704.

Embodiments of the applicator systems, as described above, facilitate the application of pressure to a structure. More particularly, embodiments of the present disclosure relate to applicator systems that include, at least, an applicator that is jammed under vacuum and/or unjammed under positive pressure, such that the applicator is, in an unjammed configuration, deformable about a receiving surface of a forming tool and, in a jammed configuration, holds the shape of the forming tool for forming a structure on the forming tool. The structure is placed on the forming tool and a loading force is applied through the applicator assembly to the structure to press the structure on the forming tool. In addition, in some embodiments, the applicator is pressurized to apply additional pressure on the structure over the forming tool.

Exemplary technical effects of the applicator systems described herein include, for example: (a) forming a structure between a jammed applicator and a forming tool; (b) forming a structure between a pressurized applicator and a forming tool; (c) forming a structure between a jammed and/or pressurized applicator and a forming tool, in which the applicator is at least partially surrounded by an unjammed and/or pressurized applicator casing; and (d) forming a structure between a jammed and/or pressurized applicator and a forming tool, in which the applicator is at least partially surrounded by a rigid external frame.

Exemplary embodiments of applicator systems and related components are described above in detail. The systems are not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where pressure forming a structure is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An applicator assembly for applying pressure to a composite structure, said applicator assembly comprising:
    an external frame;
    an applicator casing disposed substantially within said external frame, said applicator casing comprising:
        a first membrane including a first contact surface configured to contact a receiving surface of a forming tool; and
        a first jamming material disposed within said first membrane; and
    an applicator disposed substantially within said applicator casing, said applicator comprising:
        a second membrane including a second contact surface configured to contact the composite structure; and
        a second jamming material disposed within said second membrane, and
    wherein said applicator is disposed within said applicator casing such that said first contact surface surrounds said second contact surface.

2. The applicator assembly of claim 1, wherein said applicator casing is configured to conform to the receiving surface of the forming tool, the receiving surface having at least one non-planar feature.

3. The applicator assembly of claim 1, wherein said applicator casing is configured to partially extend about said applicator.

4. The applicator assembly of claim 1, wherein at least one of said applicator and said applicator casing defines a cavity configured to be coupled in fluid communication with an air pump, and wherein the at least one of said applicator and said applicator casing is configured to be at least one of pressurized and jammed by the air pump.

5. The applicator assembly of claim 1, wherein said applicator casing and said applicator each define a cavity configured to be coupled in fluid communication with an air pump, and wherein said applicator and said applicator casing are each configured to be at least one of pressurized and jammed by the air pump.

6. The applicator assembly of claim 1, wherein said applicator assembly is coupled to a movement mechanism that is configured to control movement of said applicator assembly.

7. The applicator assembly of claim 6, wherein said movement mechanism is configured to apply a force through said applicator assembly.

8. An applicator system for applying pressure to a composite structure, said applicator system comprising:
    a forming tool having a receiving surface for receiving a composite structure;
    an air pump; and
    an applicator assembly coupled to said air pump and configured to press the composite structure on said receiving surface, said applicator assembly comprising:
        an external frame;
        an applicator casing disposed substantially within said external frame, said applicator casing comprising:
            a first membrane including a first contact surface configured to contact said receiving surface; and
            a first jamming material disposed within said first membrane; and
        an applicator disposed substantially within said applicator casing, said applicator comprising:
            a second membrane including a second contact surface configured to contact the composite structure; and
            a second jamming material disposed within said second membrane, and
        wherein said applicator is disposed within said applicator casing such that said first contact surface surrounds said second contact surface.

9. The applicator system of claim 8, wherein said applicator casing is configured to conform to said receiving surface of said forming tool, said receiving surface having at least one non-planar feature.

10. The applicator system of claim 8, wherein said applicator casing is configured to partially extend about said applicator.

11. The applicator assembly of claim 8, wherein at least one of said applicator and said applicator casing defines a cavity configured to be coupled in fluid communication with the air pump, and wherein the at least one of said applicator and said applicator casing is configured to be at least one of pressurized and jammed by the air pump.

12. The applicator assembly of claim 8, wherein said applicator casing and said applicator each define a cavity configured to be coupled in fluid communication with the air pump, and wherein said applicator and said applicator casing are each configured to be at least one of pressurized and jammed by the air pump.

13. The applicator assembly of claim 8, wherein said applicator assembly is coupled to a movement mechanism that is configured to control movement of said applicator assembly.

14. The applicator assembly of claim 13, wherein said movement mechanism is configured to apply a force through said applicator assembly.

* * * * *